US011381597B2

(12) United States Patent
Lancioni et al.

(10) Patent No.: US 11,381,597 B2
(45) Date of Patent: Jul. 5, 2022

(54) EXPEDITION OF WEB PHISHING DETECTION FOR SUSPICIOUS SITES

(71) Applicant: McAfee, LLC, San Jose, CA (US)

(72) Inventors: German Lancioni, San Jose, CA (US); Cedric Cochin, Portland, OR (US)

(73) Assignee: McAfee, LLC, San Jose, CA (US)

( * ) Notice: Subject to any disclaimer, the term of this patent is extended or adjusted under 35 U.S.C. 154(b) by 258 days.

(21) Appl. No.: 16/517,403

(22) Filed: Jul. 19, 2019

(65) Prior Publication Data
US 2021/0021638 A1    Jan. 21, 2021

(51) Int. Cl.
*H04L 9/40* (2022.01)
(52) U.S. Cl.
CPC ...... *H04L 63/1483* (2013.01); *H04L 63/1416* (2013.01); *H04L 63/1425* (2013.01); *H04L 63/1433* (2013.01)
(58) Field of Classification Search
CPC ............. H04L 63/1483; H04L 63/1416; H04L 63/1425; H04L 63/1433
See application file for complete search history.

(56) References Cited

U.S. PATENT DOCUMENTS

| 7,890,612 | B2* | 2/2011 | Todd | H04L 63/1483 |
| | | | | 709/220 |
| 8,819,826 | B2* | 8/2014 | Sallam | G06F 21/566 |
| | | | | 726/24 |
| 9,009,820 | B1* | 4/2015 | McDougal | G06F 21/567 |
| | | | | 726/22 |
| 9,516,055 | B1* | 12/2016 | Liu | H04L 63/1433 |
| 9,516,058 | B2* | 12/2016 | Antonakakis | H04L 61/1511 |
| 9,621,566 | B2* | 4/2017 | Gupta | H04L 63/1483 |
| 10,044,739 | B2* | 8/2018 | Muttik | G06F 21/56 |
| 10,581,883 | B1 | 3/2020 | Syme et al. | |
| 11,003,775 | B2* | 5/2021 | Kraemer | G06F 21/554 |
| 2007/0118528 | A1 | 5/2007 | Choi et al. | |
| 2007/0245422 | A1* | 10/2007 | Hwang | G06F 21/31 |
| | | | | 726/26 |

(Continued)

FOREIGN PATENT DOCUMENTS

EP         3599753 A1    1/2020
KR    1020080027035 A   3/2008

(Continued)

OTHER PUBLICATIONS

U.S. Appl. No. 16/676,939 entitled "Visual Detection of Phishing Websites Via Headless Browser," filed Nov. 7, 2019; 72 pages.

(Continued)

*Primary Examiner* — Sarah Su
(74) *Attorney, Agent, or Firm* — Patent Capital Group

(57) ABSTRACT

There is disclosed in one example a computing apparatus, including: a processor and a memory; a uniform resource locator (URL) reputation store; a network interface; and instructions encoded within the memory to instruct the processor to: receive via the network interface a request for a reputation for a URL; query the URL reputation store and determine that the URL does not have a known reliable reputation; add the URL to a URL analysis queue; perform a rough analysis of the URL, and determine from the rough analysis that the URL potentially is for a phishing website; and move the URL ahead in the analysis queue.

20 Claims, 11 Drawing Sheets

(56) References Cited

U.S. PATENT DOCUMENTS

| | | | |
|---|---|---|---|
| 2008/0133540 A1 | 6/2008 | Hubbard et al. | |
| 2010/0100958 A1 | 4/2010 | Jeremiah | |
| 2010/0332593 A1* | 12/2010 | Barash | H04L 63/145 |
| | | | 709/203 |
| 2012/0158626 A1 | 6/2012 | Zhu et al. | |
| 2013/0074185 A1 | 3/2013 | McDougal et al. | |
| 2013/0227636 A1 | 8/2013 | Bettini et al. | |
| 2017/0195363 A1 | 7/2017 | Dahan et al. | |
| 2018/0027013 A1 | 1/2018 | Wright et al. | |
| 2018/0054737 A1* | 2/2018 | Guo | H04W 12/122 |
| 2018/0191778 A1 | 7/2018 | Volkov | |
| 2019/0014149 A1 | 1/2019 | Cleveland et al. | |
| 2019/0068638 A1 | 2/2019 | Bartik et al. | |
| 2020/0252428 A1* | 8/2020 | Gardezi | H04L 63/1416 |
| 2021/0144174 A1 | 5/2021 | N | |

FOREIGN PATENT DOCUMENTS

| | | | | |
|---|---|---|---|---|
| WO | WO-2007007988 A2 * | 1/2007 | | G06F 21/31 |
| WO | 2016034935 A1 | 3/2016 | | |

OTHER PUBLICATIONS

Cordero, et al., "Catching Phish: Detecting Phishing Attacks from Rendered Website Images," Dec. 2016.

* cited by examiner

US 11,381,597 B2

EXPEDITION OF WEB PHISHING DETECTION FOR SUSPICIOUS SITES

FIELD OF THE SPECIFICATION

This application relates in general to computer security, and more particularly though not exclusively to a system and method for expedition of web phishing detection for suspicious websites.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
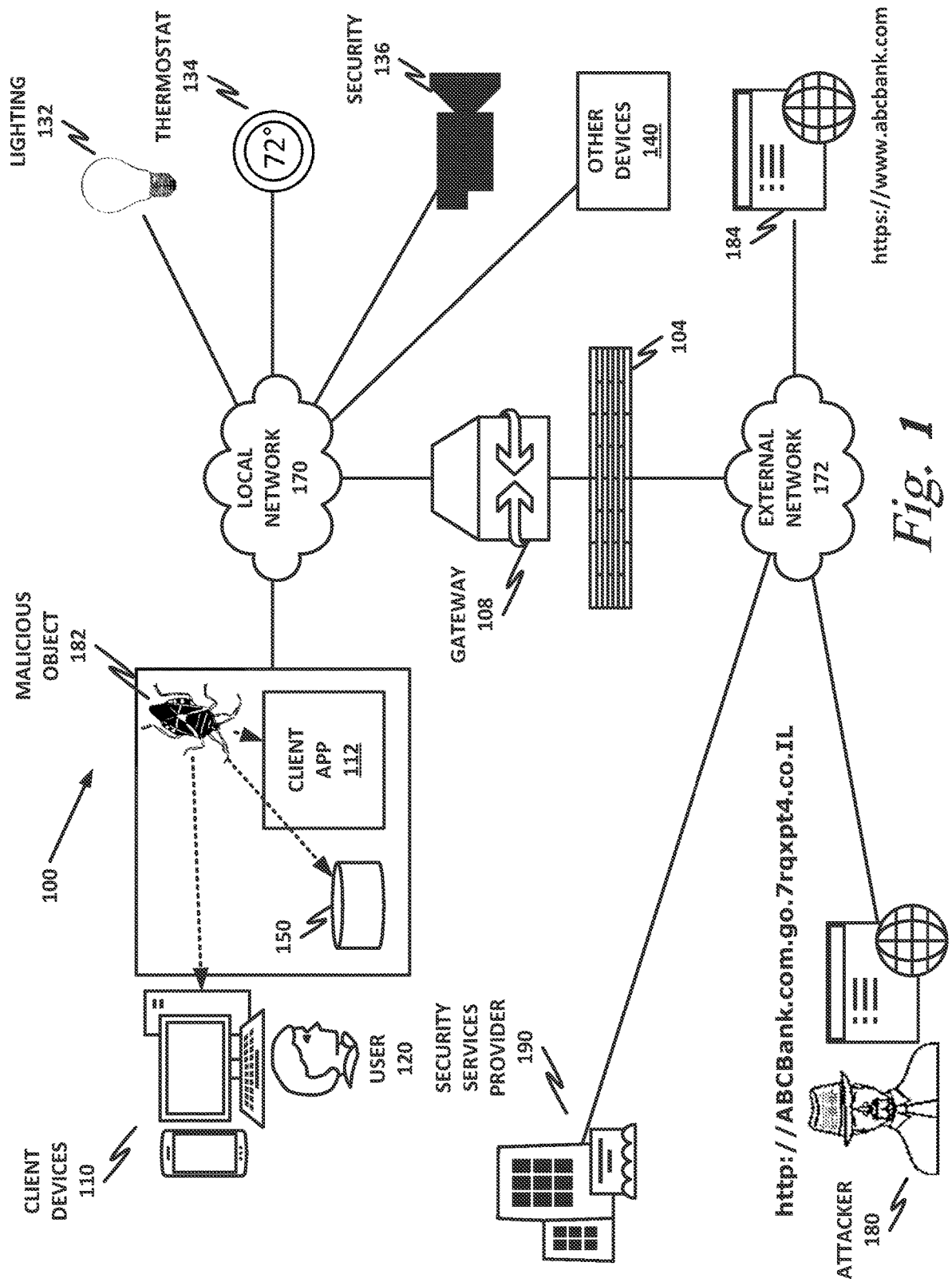
FIG. 1 is a block diagram illustrating selected elements of a security ecosystem.

In an example, there is disclosed a computing apparatus, comprising: a processor and a memory; a uniform resource locator (URL) reputation store; a network interface; and instructions encoded within the memory to instruct the processor to: receive via the network interface a request for a reputation for a URL; query the URL reputation store and determine that the URL does not have a known reliable reputation; add the URL to a URL analysis queue; perform a rough analysis of the URL, and determine from the rough analysis that the URL potentially is for a phishing website; and move the URL ahead in the analysis queue.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A "phishing" attack occurs when an attacker attempts to convince a user to provide sensitive information, which could include, for example, a username, password, Social Security number, banking information, personally identifying information (PII), proprietary information, confidential information, classified information, or any other sensitive information. Phishing is essentially a social engineering attack. The point of phishing is not to necessarily compromise the device itself, but rather to convince the user to voluntarily supply the sensitive information.

For example, one form of phishing attack uses false websites that are designed to look like the legitimate websites of banks or other institutions to which a user may legitimately supply information. For example, if a customer of ABC Bank normally logs into the "ABCBank.com" website to conduct online banking, then a phishing attacker may create a fake website that is designed to look identical to the ABCBank.com website. The attacker then secures a suspicious uniform resource locator (URL), such as:

http://ABCBank.com.go.7rqxpt4.co.IL

At first glance, the user ignores the elements following ABCBank.com, and instead believes that those elements are merely the kind of hypertext markup language (HTML) GET code that is commonly used after URLs. Thus, the user clicks on the malicious link, and is directed to a website that looks like the ABCBank.com website. The user dutifully fills in his or her username and password for ABCBank.com, and appears to encounter an error or a failure to load the next page. The user then types in "ABCBank.com" in order to log in again, and this time is successful. In this case, the user may not even realize that he or she has been the subject of a phishing attack. The malicious actor has collected the target's username and password without the target even realizing it. The attacker can then log in to ABCBank.com, and can divert funds or cause other mischief.

Phishing attacks can take many different forms, such as false charities, false banking sites, false sweepstakes, false genealogy sites, or other sites that attempt to collect personal information that can be used to compromise data security.

Security service providers may be able to provide security agents that help to defeat these types of phishing attacks. For example, a security services provider such as MCAFEE, LLC may provide a global reputation store such as MCAFEE, LLC's global threat intelligence (GTI™), which includes a global cache of reputations for many different kinds of objects. This can include cache reputations for many different phishing sites, which can be identified by URL and other characteristics.

One challenge of a global reputation cache is that phishing sites are aware of these caches, and thus use tricks to get around the reputations. For example, many phishing sites will change their URLs frequently, as often as once or more per hour, thus defeating caches that are based solely on URL identification.

Because analysis of potential phishing URLs is essentially a race to identify and mitigate those URLs while that mitigation is still relevant, there is a benefit in identifying potentially malicious URLs and prioritizing more detailed analysis of those URLs.

For example, a security services provider may have a global repository or cache of URL reputations. As new, unknown URLs are first encountered, these URLs are added to an analysis queue. For example, a subscriber to the service may encounter a new URL, and a client device may query the global repository for a reputation for the URL. Note that URLs under analysis may be compared to current versions of known websites, or to one or more archived previous versions of those websites. If there is a known reputation, it is returned. But if the reputation is not known, then further analysis is required before the URL can be assigned a reliable reputation.

The security services provider may operate an analysis server that is very capable of reliably detecting the features of a phishing website. But this analysis takes time. As many endpoints encounter new URLs and request analysis of those URLs, the volume of analyses can quickly outstrip the ability of the analysis server to completely analyze the URLs. It is, therefore, beneficial to provide an analysis server with a "first pass" rough analysis engine that can identify potential phishing websites.

In some cases, a rough analysis engine uses the visual similarity of phishing websites to the sites that they are trying to mimic. For example, PayPal is a popular target for phishing websites. Thus, successful phishing websites that are trying to procure PayPal account information will naturally want their websites to look more like the actual PayPal website. The rough analysis engine may take a screenshot of the phishing homepage, and compare it to a screenshot of the actual homepage for the legitimate site. If the two screenshots are visually similar, this provides a hint that the URL may be a phishing URL. This analysis can be performed very quickly if a screenshot is taken with low resolution, certain elements are eliminated from consideration (such as text), and the analysis is performed on the high-level or gross visual features of the two websites. If the two websites are sufficiently visually similar, then the site under analysis may be marked as potentially a phishing site. A benefit of this approach is that while it can be defeated by making the phishing website visually dissimilar to the target website, this also makes it less likely that users will be deceived by the phishing site. For example, regular PayPal customers will know what the PayPal homepage looks like. If the phishing site looks radically different from the PayPal homepage, then the user is unlikely to be deceived. In fact, operators of phishing sites often take great pains to mimic the visual appearance of their target websites as closely as possible.

The analysis by the rough analysis engine may not be completely reliable, and in particular, may yield a high number of false positives. But characteristically, the rough analysis engine has a much lower incidence of false negatives. In other words, if the rough analysis engine tags a URL as a potential phishing website, that URL may or may not be an actual phishing website. But if the rough analysis engine tags the URL as likely not a phishing website, then there is a relatively low probability that the URL is, in fact, a phishing website.

When the rough analysis engine identifies a URL as being a potential phishing URL, that URL can be given priority in the analysis queue. Thus, URLs that are more likely to point to phishing websites are analyzed first, before URLs that are not tagged by the rough analysis engine.

This phishing protection provides a valuable benefit to end users. Phishing is an old, but still very active, cyber security threat that continues to be effective, particularly against untrained users. Effectively fighting the phishing threat may demand big infrastructure and expensive resources. Typically, millions of URLs are created every week, and because web phishing campaigns have a very short lifespan, detecting phishing sites has become very challenging.

In contemporary practice, the phishing issue is addressed by a combination of threat intelligence feeds provided by security services providers (e.g., wherein URLs are submitted to feeds for verification), and heuristics or models based mainly on URL attributes. Running these heuristics and models in a timely manner is challenging. Detection mechanisms may therefore be applied in a deferred mode. Assigning the right reputation to a URL may take somewhere on the order of hours, and even up to days in some cases. This creates a window for bad actors to compromise users who visit zero-day phishing websites. By the time the URL is properly classified as phishing, the site may have long since disappeared.

However, the methods disclosed in the present specification reduce the user's exposure time to phishing websites while the URL reputation assignment process is ongoing. This reduces the gap between the time when a newly created phishing website appears, and the time when its URL is assigned a reliable bad reputation. The system and method disclosed herein are particularly useful to high volumes of URLs that can be processed in real time or near real time.

Because the volume of incoming URLs is very high, timely processing of all the URLs may not be feasible. Some techniques such as heuristic rules are easier and faster to apply, but others such as URL machine learning models demand more computation time. The system disclosed herein provides a method to prioritize the queues of URLs that are waiting to be processed by the next batch of detection mechanisms. The prioritization mechanism is also a means of flagging potentially suspicious sites, which may provide users with more timely information. For example, if a site appears to be suspicious according to the rough analysis engine, the user may be notified that a reliable reputation cannot yet be assigned, but the site appears to be suspicious and the user should exercise extra caution in interacting with the website. In particular, the user may be warned that there is an elevated risk of danger in sending personally identifying information or account details to the suspicious website.

The system and method disclosed herein reduce the user's exposure time to phishing sites by speculatively prioritizing URLs queued in the list of scan-pending URLs. This may be based on the likelihood of a site being a phishing site. The method also identifies potential phishing sites, but that initial identification may not necessarily be a reliable or accurate determination. Rather, it may be considered a "first pass" analysis that is likely to catch a substantial number of non-phishing sites, but that is also unlikely to miss true phishing sites.

Because processing high volumes of URLs in real time is not feasible to some existing systems, these systems may use various strategies to queue and scan URLs in batches using workflows. As a practical matter, these are deferred executions that assign a reputation after the URL is first encountered. Indeed, in some cases, these batching systems assign a URL after the website hosted there is gone and is no longer relevant. So in some cases, the analysis provides no practical benefit with respect to the specific URL itself, because by the time a reputation is assigned, the phishing site has already relocated. However, the information gleaned from the analysis may at least be used in heuristic models.

To provide better responsiveness, some existing systems implement strategies to optimize a queue by eliminating known URLs, skipping URLs that are either whitelisted or blacklisted, or removing URLs with similar paths. However, at least some embodiments of the present specification provide advantages over these methods because they allow reduced time to assign a phishing reputation to a site, while preserving existing infrastructure limitations of high-volume architectures. The system may enable a dynamic queuing system that optimizes the scanning and reputation assignment of suspected URLs first, so that end users are less exposed to phishing threats from these suspected URLs.

A side effect of this function is that it also produces an insight that may itself be an input for a phishing detection mechanism, by flagging sites that are suspicious. Depending on the context, this analysis method may or may not be sufficient, by itself, to reliably identify phishing websites.

A system and method for expedition of web phishing detection for suspicious sites will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. Embodiments of security ecosystem 100 may be configured or adapted to provide expedition of web phishing detection for suspicious sites, as disclosed in the present specification.

In the example of FIG. 1, security ecosystem 100 may be an enterprise, a government entity, a data center, a telecommunications provider, a "smart home" with computers, smart phones, and various Internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the Internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between home network 172 and external network 170. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

In this example, attacker 180 operates a phishing website at the URL http://abcbank.com.go.7rqxpt4.co.IL. User 120 is a customer of ABC Bank, and regularly uses client devices 110 to access website 184 which provides services for ABC Bank, namely at the URL https://www.abcbank.com.

To try to compromise PII, account information, or other sensitive information from user 120, attacker 180 may design the false website to be visually very similar to the homepage, a login page, or other portion of legitimate website 184. Thus, attacker 180 may have as one goal to induce user 120 to visit http://abcbank.com.go.7rqxpt4.co.IL. For example, attacker 180 may provide the link in an email, as a phishing advertisement, or by some other mechanism to try to get user 120 to click on the link. When user 120 sees the link, he may see "abcbank.com," gloss over the rest of the URL, and assume that this is a legitimate website. If user 120 is sufficiently credulous, he may attempt to log into the false website, and thus provide his username and password to attacker 180. Furthermore, he may be tricked into providing other useful information, such as an account number, a birthday, answers to security questions, or other sensitive information.

Security services operator 190 may operate a global repository or cache of URL reputations, and may have security servers that are very capable of identifying phishing websites and blocking them. However, this URL service may require millions or even billions of URL submissions every week. After the URLs have been filtered with basic mechanisms (e.g., known/unknown, duplicated, whitelisted, blacklisted, malformed, etc.), all of the URLs with unknown reputations may be treated with the same level of priority, according to some known techniques in the art. In other words, the URL queue is a first in/first out (FIFO) queue. Under this scenario, a legitimate URL could be processed in a matter of minutes, while a phishing URL submitted moments later could be processed hours later, depending on the service load. Thus, by the time security services provider 190 analyzes the URL http://abcbank.com.go.7rqxpt4.co.IL, the phishing site may have already moved to a new location, and the information may be stale. This is illustrated in FIG. 2.

Figure 2:
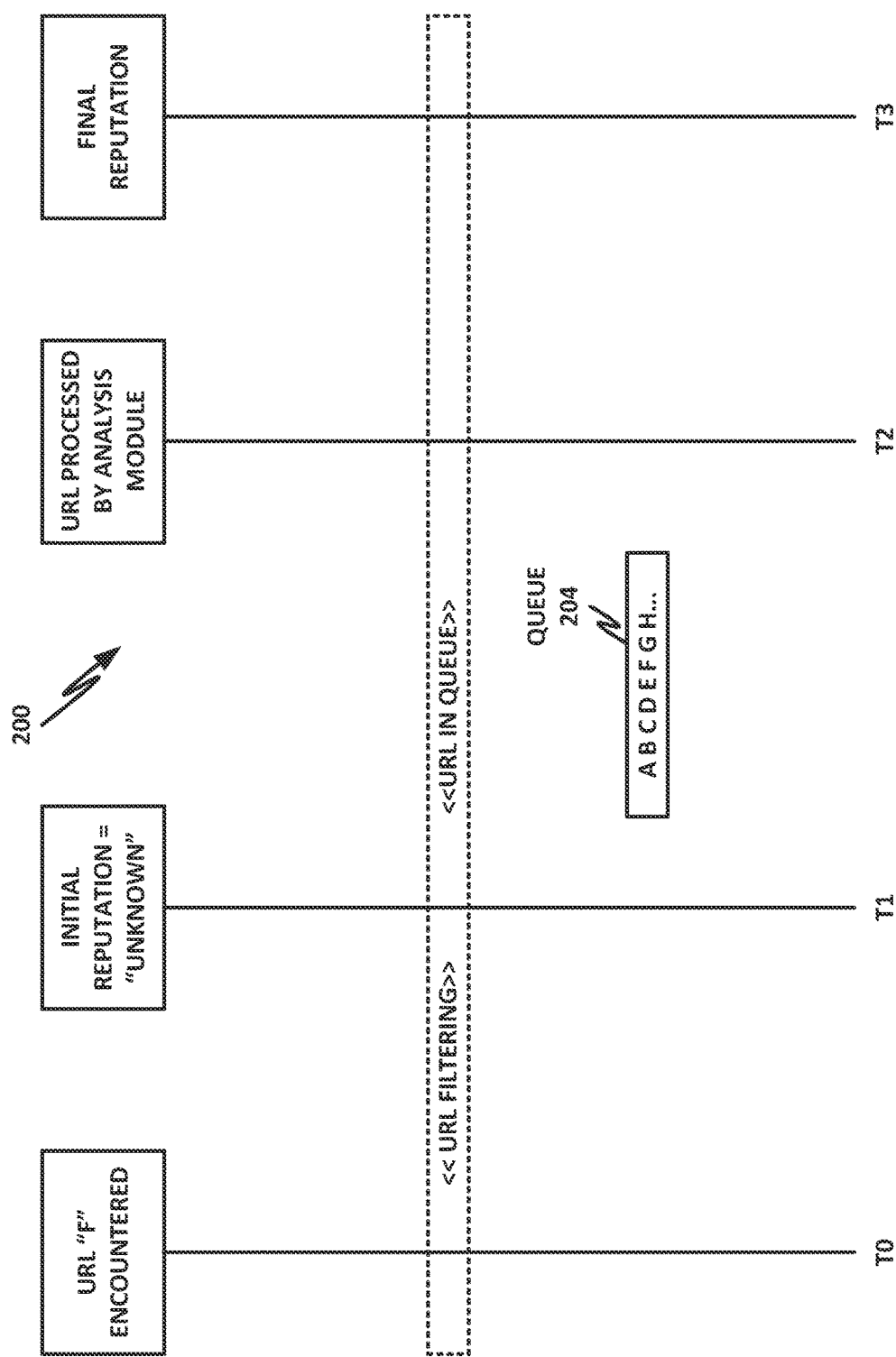
FIG. 2 is a block diagram of a queuing mechanism.

FIG. 2 is a block diagram of a queuing mechanism 200. In this illustration, queue 204 operates without the benefit of a rough analysis engine and without queue reordering. In this example, filtered URLs are processed in a FIFO fashion. In other words, at T0, URL "F" is submitted. At T1, after applying ordinary URL filtering, it is determined that T1 has an unknown initial reputation. URL F is then added to a URL queue. In this queue, URLs A, B, C, D, and E precede URL F, while URLs G and H are received after URL F, and therefore are analyzed after it.

At T2, URL F is processed by the analysis workflow. At T3, URL F is assigned a final reputation, such as being marked as either legitimate or as a phishing website.

In this embodiment, the average time to assign a phishing reputation is generally the same as an average time to assign a legitimate reputation. In other words, all newly encountered URLs are processed with the same priority.

Figure 3:
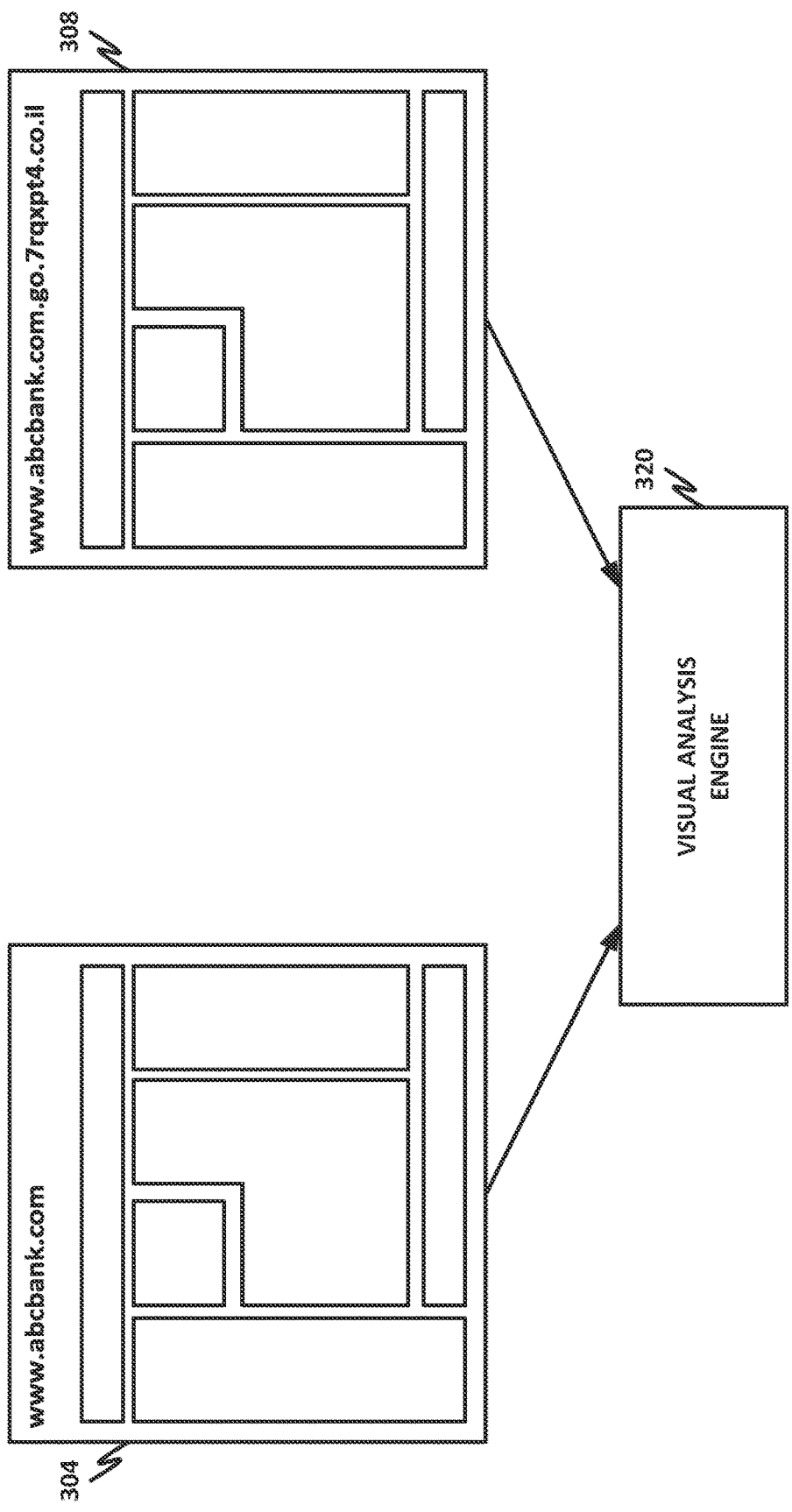
FIG. 3 illustrates an embodiment wherein queuing may be improved by the use of a rough analysis engine.

FIG. 3 illustrates an embodiment wherein queuing may be improved by the use of a rough analysis engine. In this example, the rough analysis engine is represented by a particular embodiment in which a visual analysis engine 320 is used to analyze newly encountered URLs. As illustrated here, legitimate website 304 has the URL https://www.abcbank.com. Phishing website 308 has the URL http://abcbank.com.go.7rqxpt4.co.IL. The first time a user newly encounters phishing website 308, a security agent on the end user device may query a cloud service for a globally reliable reputation for phishing website 308 at the described URL. Initially, the cloud security provider may not have a reliable reputation for the unknown URL.

Without some kind of queuing priority engine, the newly encountered URL would be placed in the queue behind whatever URLs are ahead of it. But in this case, the cloud security provider also operates a visual analysis engine 320. The URL https://www.abcbank.com has been identified in this case as one of the top n targeted websites for phishing. In one example, n is approximately 100. Because https://www.abcbank.com is one of the top 100 websites for targeting by phishing attackers, visual analysis engine 320 stores an image of the homepage, or other pages of interest, from https://www.abcbank.com. While this could be a high-resolution image, it could also be a relatively low-resolution image, and may have irrelevant features such as text and dynamic elements obscured or reduced to block representations. Furthermore, the stored image may have a relatively low color depth, so that a phishing website cannot defeat the mechanism by using colors that are close enough for human perception, but that are differentiated from the actual website. When the cloud security provider first encounters phishing website 308, as a first pass analysis—which may even be performed in real time with the initial request—visual analysis engine 320 takes a snapshot of website 308. This may be a low resolution snapshot. Visual analysis engine 320 then compares gross visual features of website 308 with the top n websites that are known phishing targets. In this case, phishing website 308 matches website 304 for https://www.abcbank.com. Therefore, the analysis of the URL http://abcbank.com.go.7rqxpt4.co.IL may be expedited, or placed at or near the front of the analysis queue.

Design and implementation considerations will, in some cases, determine how detailed an analysis to perform. On the one hand, a more detailed analysis yields higher confidence that this is a phishing website. It is extremely unlikely for a legitimate, non-phishing website to have an exact (or nearly exact) matching layout to https://www.abcbank.com. Furthermore, the confidence of the analysis can be increased by increasing the number of popular websites (n). For n=200, 500, or 1000, better final results will be provided than for n=2, 5, 10, 50, or 100. Similarly, the resolution of the comparison provides a cost trade-off. A higher resolution comparison will provide better overall results and better confidence that the websites are a visual match, as opposed to, for example, simply having similar block layouts. However, the more detailed the analysis, the more time it will take, and the more real time pressure this will place on the analysis.

Thus, it is advantageous for a designer implementing the teachings of the present specification to select an appropriate visual comparison resolution and an appropriate value of n to provide the best trade-off between accuracy of analysis and speed of analysis. This will depend, for example, on the compute resources dedicated to the task, the network bandwidth available, the cost of the comparison, and the cost-benefit trade-off analysis between the queuing prioritization and the full analysis of the queue.

Visual analysis engine 320 provides a speculative mechanism that can be used to reorder the queue of URLs to be processed by workflows (i.e., more detailed analysis scanners) in such a way that it minimizes the average user exposure time to phishing websites or potential phishing websites. With speculative queue prioritization applied, the average time to assign a phishing reputation will be lower than the average time required to assign a legitimate reputation. This is because potential phishing websites are prioritized in the queue, for faster analysis. This helps to assign phishing reputations to malicious websites before they become stale, and therefore while the data are most useful. On the other hand, if a website is legitimate, there may be less urgency in assigning it a legitimate reputation. A legitimate website is expected to stay "parked" at the same URL for a much longer time than a phishing URL. This translates into a better mitigation of the phishing threat, as phishing sites are detected earlier. Because delaying the classification of a site as legitimate has relatively fewer threat-related consequences, this approach provides a better overall solution.

Figure 4:
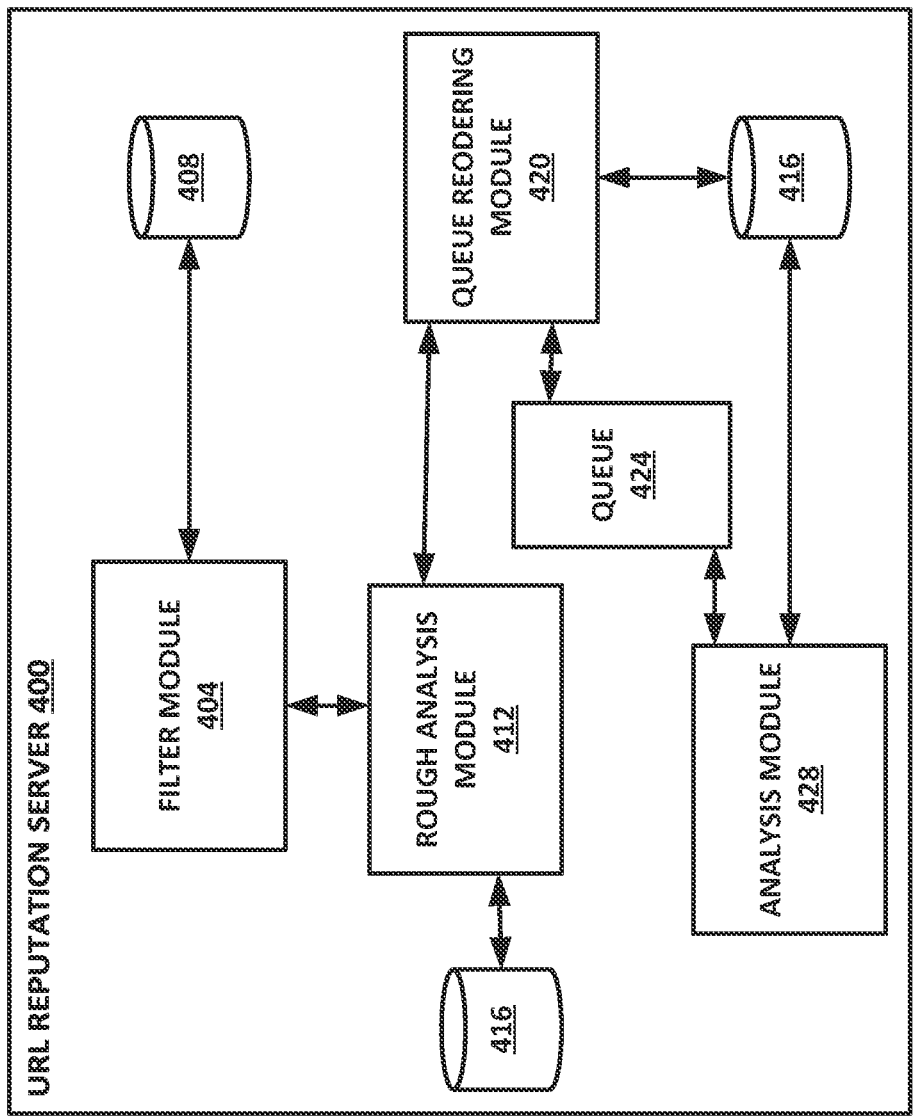
FIG. 4 is a block diagram of selected elements of a URL reputation server.

FIG. 4 is a block diagram of selected elements of a URL reputation server 400. FIG. 4 illustrates selected elements of the URL reputation server at a block level only. This should be understood as a disclosure of certain functional elements. It should be noted that the functional elements disclosed herein do not necessarily represent discrete hardware elements. Rather, in one embodiment, the modules illustrated herein may be implemented as software modules stored as transitory or non-transitory instructions on a computer-readable medium to instruct a processor to perform the function of each module. In other embodiments, the function of a module could be provided as a coprocessor, a hardware accelerator, an application-specific integrated circuit (ASIC), a field-programmable gate array (FPGA), a multi-chip module, a system-on-a-chip, or in some other hardware, software, and/or firmware embodiment.

In this illustration, URL reputation server 400 includes a filter module 404. Filter module 404 may first communicate with a global reputation store 408, which contains reputations for known URLs. When filter module 404 queries global reputation store 408, a known reputation for the URL may be returned, in which case filter module 404 can return the known reputation to a requesting endpoint. If global reputation store 408 does not return a known reputation, then filter module 404 may apply additional filtering mechanisms. For example, filter module 404 could apply filters based on factors such as URLs that are not formatted as hypertext transfer protocol secure (HTTPS) addresses, URLs with long paths, age of URLs, prevalence of URLs, context-aware rules such as a known major phishing campaign, or other filters to help identify URLs that are more suitable candidates for detailed analysis. Filter module 404 can then provide some or all URLs to a rough analysis module 412. Note that although filtering module 404 and rough analysis module 412 are illustrated herein as distinct modules, there is not always a bright line between what constitutes "filtering" and what constitutes "rough analysis." For example, in some cases, analysis of URL length, use of HTTPS, URL age, URL prevalence, and context may be considered to be part of rough analysis module 412.

In at least some embodiments, rough analysis module 412 also performs a rough visual analysis by taking a screenshot of the unknown URL, and comparing it to a phishing target store 416. Phishing target store 416 includes snapshots of the top n websites that are phishing targets. In one illustration, n=100, although n could be selected as any suitable integer, based on the context of the system. In this case, rough analysis module 412 takes a snapshot of the newly encountered website, and compares the snapshot to the top n phishing target websites.

The results are provided to queue reordering module 420. Queue reordering module 420 determines, based on the results rough analysis, whether the new URL should be placed out of order in the queue.

Thus, in at least some cases, queue reordering module 420 may reorder elements within queue 424. Queue reordering module 420 may also have additional rules. For example, while it is beneficial to aggressively identify the most suspicious URLs and analyze those first, it is not necessarily desirable for those URLs to completely monopolize the analysis. Thus, there may be rules such as not allowing an element to be displaced in the queue if its lifespan exceeds some timeout value. For example, any element that has been in the queue for 24 hours cannot be displaced or pushed back farther in the queue.

Furthermore, it should be noted that it may not be practical in all embodiments to run rough analysis module 412 in real time on all incoming URLs. Rather, rough analysis module 412 could be run regularly, such as hourly, bi-hourly, or on some other schedule to analyze newly encountered URLs, and for reordering by queue reordering module 420.

An analysis module 428 may be provided to perform more detailed analysis on the URLs in queue 424. Because queue reordering module 424 may be configured to handle the actual order of queue 424, analysis module 428 may be able to simply treat queue 424 as a FIFO queue without having to worry about the order. In other words, analysis module 428 need not be aware of the queue reordering, but can simply process elements in queue 424 in the order that they are presented, whether or not they have been rearranged by queue reordering module 420.

Figure 5:
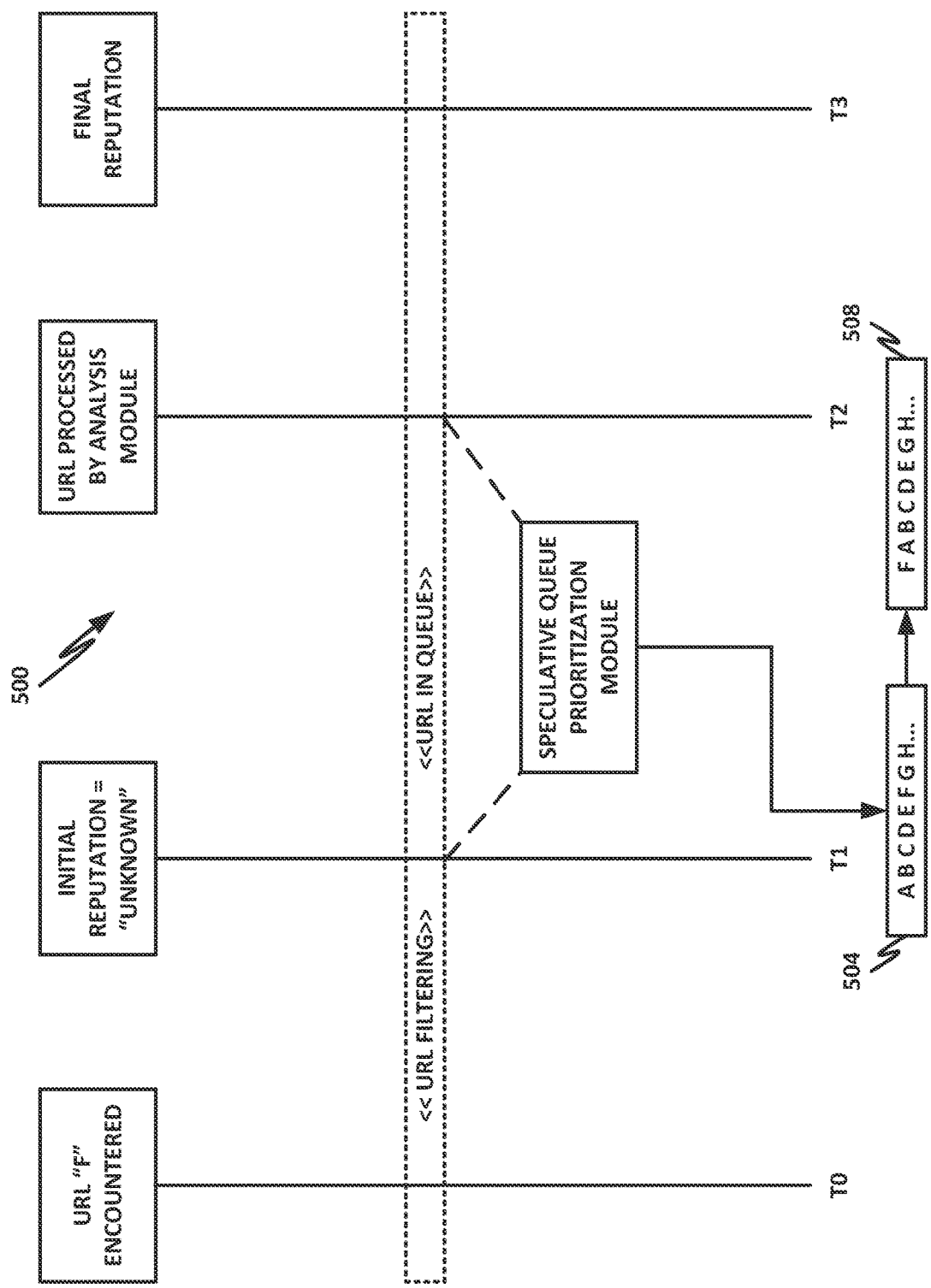
FIG. 5 is a block diagram of a queuing mechanism.

The benefit can be seen in FIG. 5.

FIG. 5 is a block diagram of a queuing mechanism 500. Queuing mechanism 500 is similar to queuing mechanism 200 of FIG. 2, except that it provides speculative reordering and/or prioritization of URLs in the queue.

Thus, at time T0, URL "F" is first encountered and submitted to the cloud service. The cloud service provides URL filtering, and at time T1, the service determines that the URL has an unknown initial reputation. In this case, speculative queue prioritization is run, and the ordering of original queue 504 is changed. Instead of A, B, C, D, E, F, G, H, original queue 504 is changed to reordered queue 508 F, A, B, C, D, E, G, H by a queue reordering module. This may be because URL F has been identified as being suspicious based on, for example, filtering and/or rough analysis. Thus, when an analysis module analyzes elements in the queue, URL F will be examined first. This is beneficial, because the rough analysis module may be configured such that URLs A, B, C, D, E, G, and H are unlikely to be phishing websites. URL F may or may not be a false positive, but if it is a phishing website, it is unlikely to be missed by the rough analysis module. The result is that the time to identify a URL as a phishing URL is less, on average, than the time to assign legitimate reputations to legitimate URLs.

Figure 6:
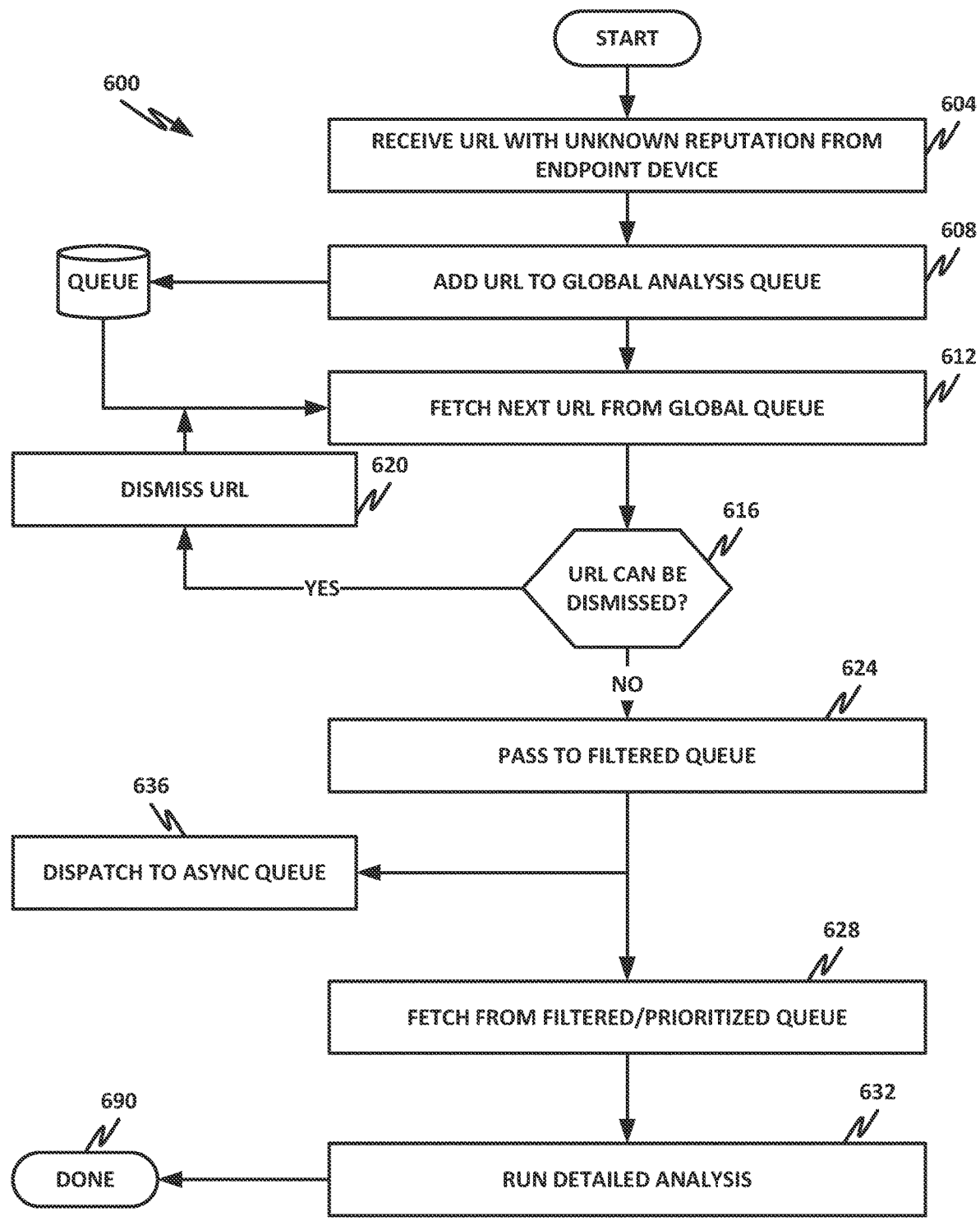
FIGS. 6 and 7 illustrate an example flow for providing phishing mitigation.
Figure 7:
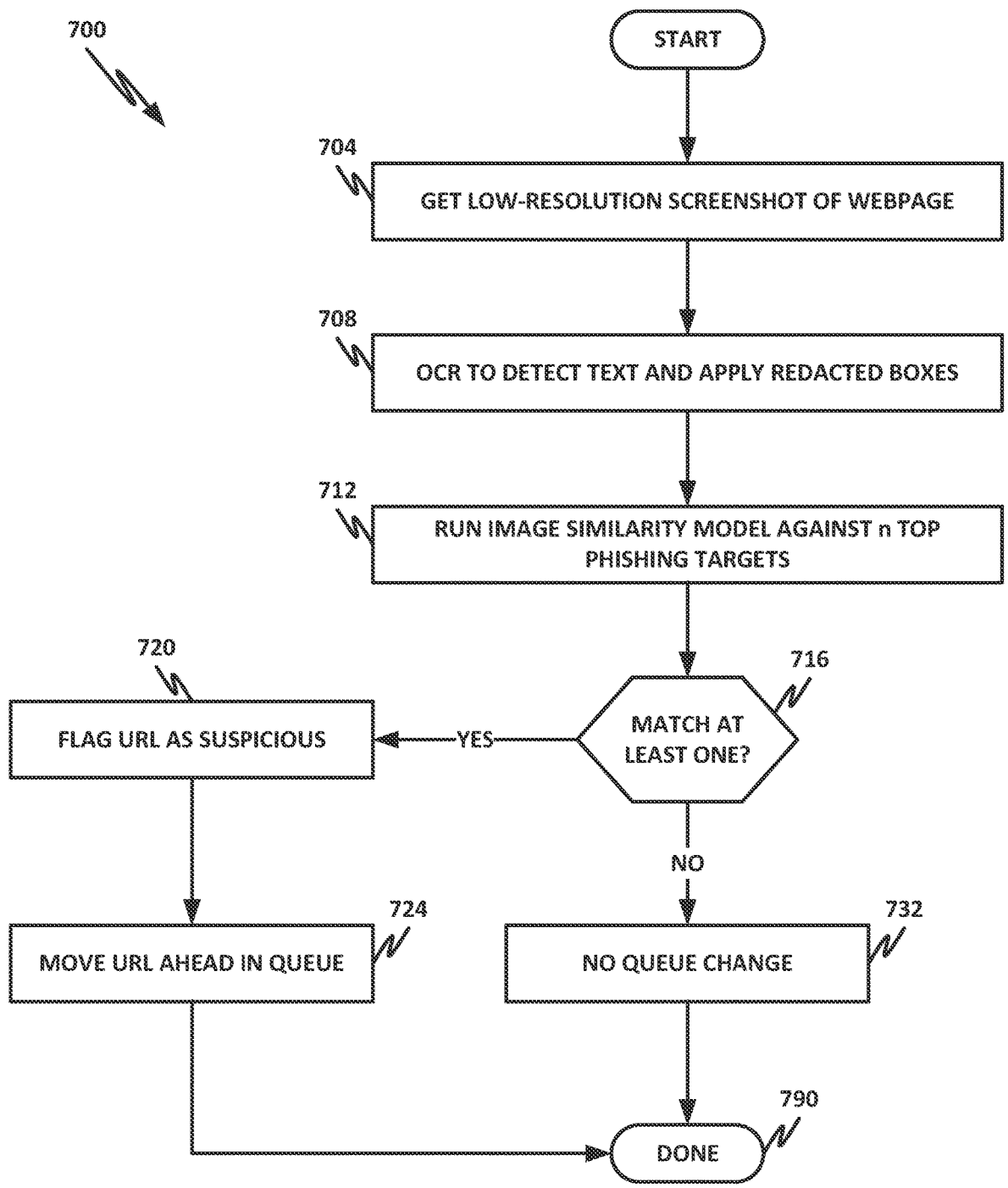

FIGS. 6 and 7 illustrate an example flow for providing phishing mitigation. In some cases, the various operations described in these two flows may be performed by the same device, or they may be performed by different devices. For example, in an enterprise data center or a cloud computing environment, the operations illustrated herein could be performed on a mainframe, or on various virtual machines running in a cloud infrastructure. Furthermore, in at least some embodiments, some or all of the operations may be performed on a user class machine or endpoint.

FIG. 6 is a flowchart of a method 600.

Beginning in block 604, a URL is submitted to an enterprise, centralized, or cloud-based reputation service. If the URL has been seen before and a reputation is available, the service may immediately return a reputation for the URL, and no further processing is required.

However, in block 608, if the URL does not have a globally known reliable reputation, then it may be added to a filtered queue. The filtered queue contains URLs that the service has not seen before and that require further processing to determine an appropriate reputation for the URL.

The reputation service may employ one or more processing strategies. Based on a processing strategy selected by the reputation service, one or more sub-workflows may be used to classify the URL as malicious (e.g., phishing, fraud, malware, or other disreputable object), or benign and/or legitimate. Some of these workflows may be more complex than others. For example, workflows may include heuristics, machine learning, pattern matching, or artificial intelligence that may require feature extraction. In some cases, the analysis queue will grow faster than the number of sub-workflows that can be consumed by the analysis system in real time.

In decision block 616, there is an initial determination of whether the URL can simply be dismissed. For example, if the URL is known, whitelisted, duplicated, or otherwise subject to a filtering criterion. If the URL can be dismissed, then in block 620, the URL is dismissed, and in block 612 the system fetches the next item from the global queue.

Returning to decision block 616, if the URL cannot be dismissed, then in block 624, it is provided to a filtered queue.

In parallel, the newly identified URL may be dispatched in block 636 to an asynchronous queue. When items are dispatched to the asynchronous queue in block 636, they may, for example, be analyzed according to method 700 of FIG. 7.

In block 628, because the queue was prioritized asynchronously, the system can simply treat the existing queue as the correct queue. In block 628, the analysis system gets the prioritized queue. In block 632, the analysis module runs conventional workflows for URL reputation assignment, using the order provided in the prioritized queue.

In block 690, the method is done.

It should be noted that the prioritized queue is not necessarily a FIFO queue, but rather may be prioritized asynchronously by a queue reordering model, which may perform a method such as method 700 of FIG. 7. With the queue prioritized, the analysis module can treat the queue as though it were a simple FIFO queue. In other words, the analysis module can work sequentially through each element in the queue without having to bother about the priority for each element.

FIG. 7 is a flowchart of method 700.

Starting in block 704, a rough analysis module begins rough analysis. For example, the rough analysis module may take a low-resolution screenshot of the website.

In block 708, optical character recognition (OCR) may be used to detect text areas and apply redacted boxes. This operation is optional, but may be used because the text is not necessarily relevant to a first pass determination of whether this is potentially a phishing website. Rather, the rough analysis module may be looking for gross visual similarity between two websites.

In block 712, the rough analysis module runs an image similarity model against the top n phishing target websites. In one illustrative example, n=100.

In decision block 716, a determination is made whether the screenshot roughly matches one of the top n phishing targets. Note that because this is a gross visual analysis, this does not necessarily mean that the two websites are identical. Rather, they are visually similar enough that the site may be marked as potentially a phishing site that warrants prioritized analysis. In some embodiments, once a single match is made, no further analysis is required. In other words, once the rough analysis module has determined that the new website is sufficiently visually similar to one of the top n phishing target websites, there is no need to determine whether it is also visually similar to others of the top phishing websites. Rather, based on this single match, the site may be marked as suspicious and subjected to priority analysis. In other embodiments, additional matches may be performed, and if there is a match to more than one site, this may influence a weighting of how suspicious the site is deemed. Thus, in some embodiments, more highly-weighted, "suspicious" websites are pushed farther to the front of the queue, while more lowly-weighted websites are not pushed as far forward in the queue. This contemplates embodiments where a single binary "suspicious" or "not" analysis is not necessarily used. Rather, gradations of suspicion may be assigned to websites, and they may be treated appropriately.

If a match is found with at least one of the top n phishing target websites, then in block 720, the URL is flagged as suspicious or potentially a phishing website. In that case, in block 724, the suspicious URL is moved to the front of the FIFO queue, or at least forward in the FIFO queue ahead of non-suspicious websites.

Returning to decision block 716, if there is no match to any of the top n phishing target websites, then the site is deemed not suspicious, and in block 732 there is no reprioritization in the queue. Rather, the URL may simply be analyzed in the ordinary first in/first out fashion, according to the time it was received. In block 790, the method is done.

Figure 8:
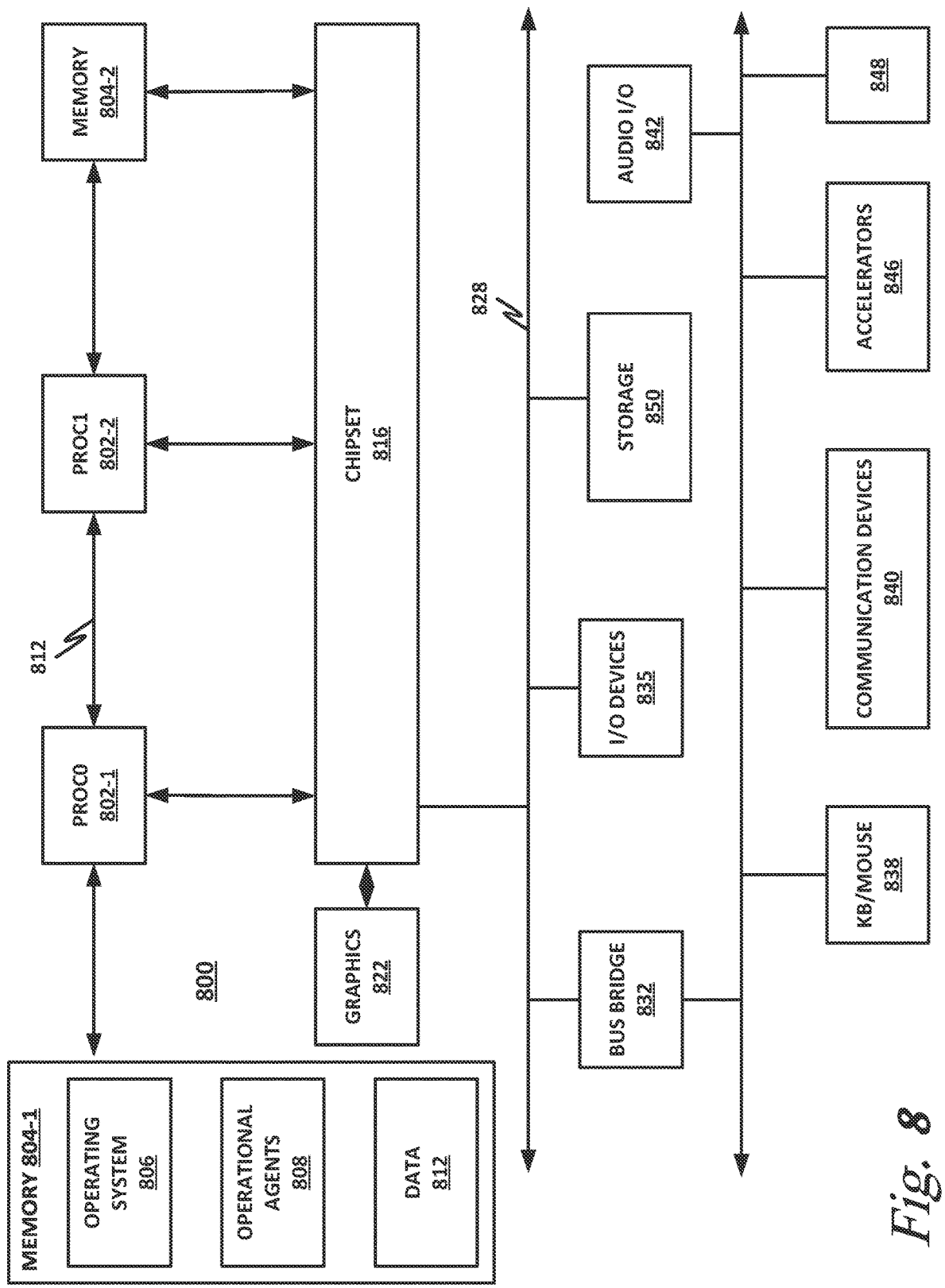
FIG. 8 is a block diagram of selected elements of a hardware platform.

FIG. 8 is a block diagram of a hardware platform 800. Embodiments of hardware platform 800 may be configured or adapted to provide expedition of web phishing detection for suspicious sites, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, Internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via network interface 848, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
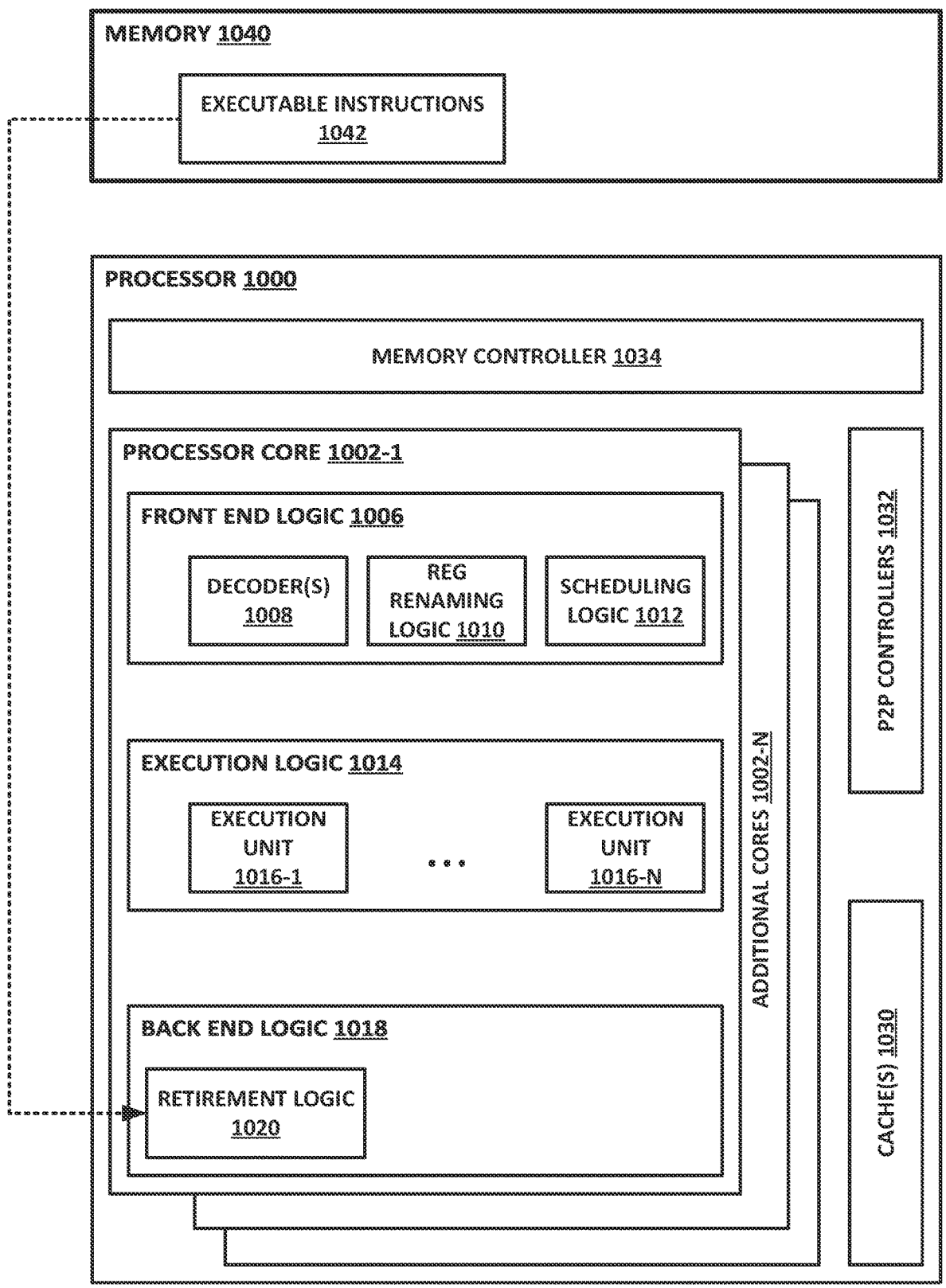
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a central processor unit (CPU) 1112 or on one or more different dies or packages. Each chipset may support any suitable number of CPUs 802. A chipset 816 (which may be a chipset, uncore, Northbridge, Southbridge, or other suitable logic and circuitry) may also include one or more controllers to couple other components to one or more CPUs.

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with processor 810 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of CPUs 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high-definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, network interface 848, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by network interface 848 and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O devices 842, a data storage device 850, and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real time operating system (including embedded or real time flavors of the foregoing). In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, processor 802 may retrieve a copy of the operational agent (or software portions thereof) from storage 850 and load it into memory 804. Processor 810 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 848 may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 848 may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

Figure 9:
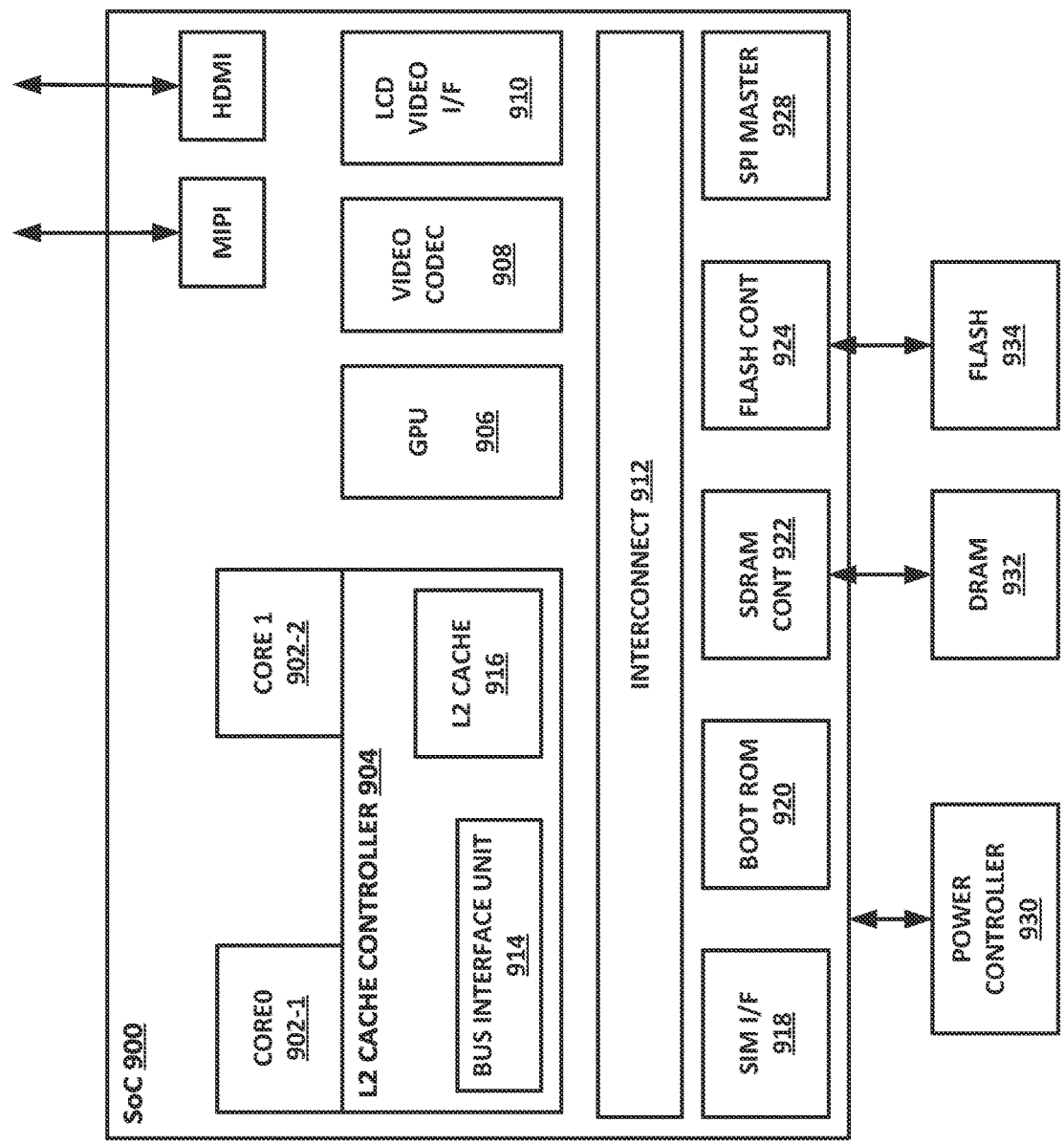
FIG. 9 is a block diagram of selected elements of a system-on-a-chip (SoC).

FIG. 9 is a block illustrating selected elements of an example SoC 900. Embodiments of SoC 900 may be configured or adapted to provide expedition of web phishing detection for suspicious sites, as disclosed in the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google *Nexus*, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902-1 and 902-2. In this illustrative example, SoC 900 also includes an L2 cache control 904, a graphics processing unit (GPU) 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/high-definition multimedia interface (HDMI) links that couple to an LCD.

SoC 900 may also include a subscriber identity module (SIM) I/F 918, a boot read-only memory (ROM) 920, a synchronous dynamic random access memory (SDRAM) controller 922, a flash controller 924, a serial peripheral interface (SPI) master 928, a suitable power control 930, a dynamic RAM (DRAM) 932, and flash 934. In addition, one or more embodiments include one or more communication capabilities, interfaces, and features such as instances of Bluetooth™ 936, a 3G modem, a global positioning system (GPS), and an 802.11 Wi-Fi.

Designers of integrated circuits such as SoC 900 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller.

FIG. 10 is a block diagram illustrating selected elements of a processor 1000. Embodiments of processor 1000 may be configured or adapted to provide expedition of web phishing detection for suspicious sites, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, central processor unit (CPU), advanced RISC (reduced instruction set computing) machine (ARM), digital signal processor (DSP), field-programmable gate array (FPGA), GPU, programmable logic array, application-specific integrated circuit (ASIC), or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

Figure 11:
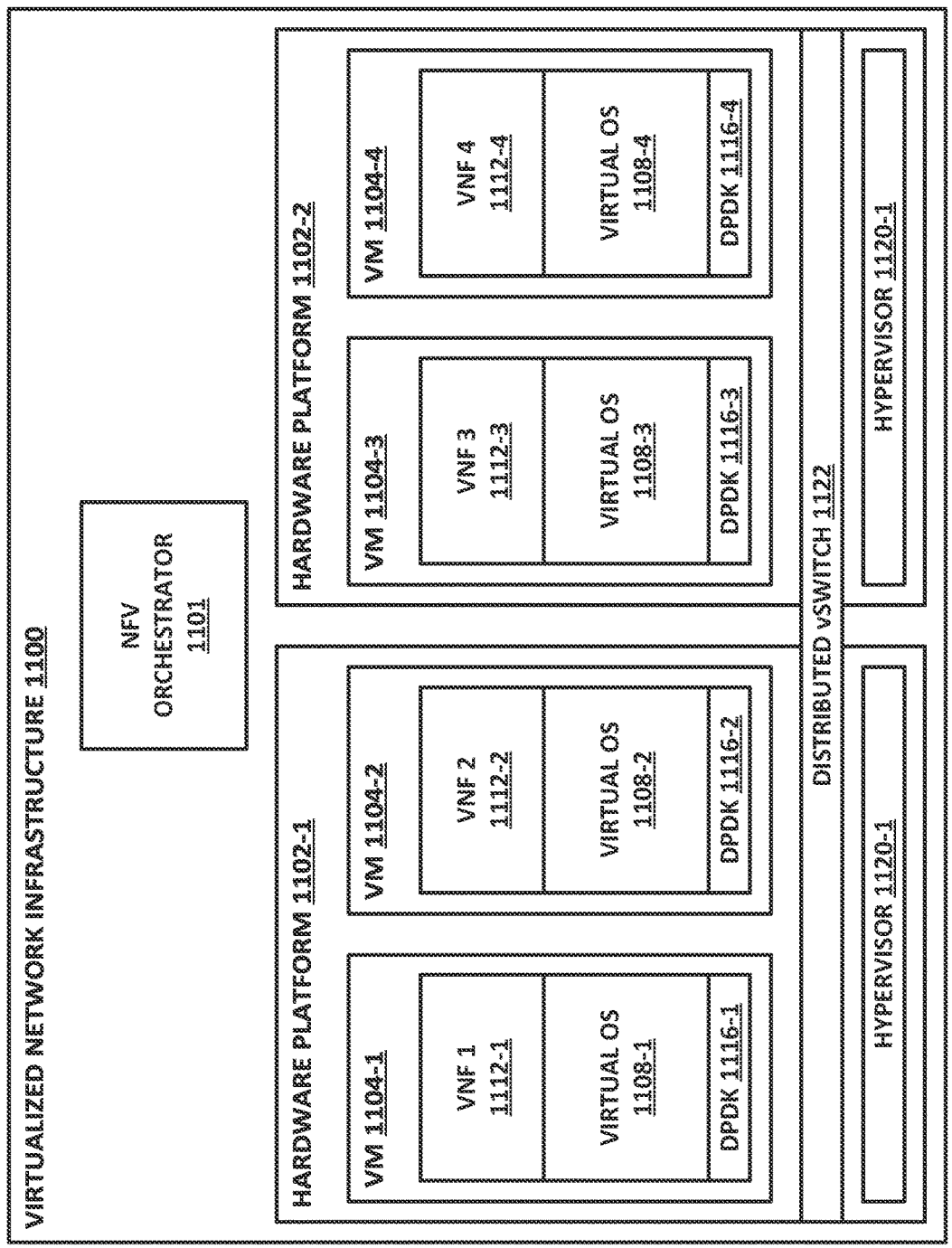
FIG. 11 is a block diagram of selected elements of a network function virtualization (NFV) infrastructure.

FIG. 11 is a block diagram of a network function virtualization (NFV) infrastructure 1100. Embodiments of NFV infrastructure 1100 may be configured or adapted to provide expedition of web phishing detection for suspicious sites, as disclosed in the present specification.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a processor and a memory; a uniform resource locator (URL) reputation store; a network interface; and instructions encoded within the memory to instruct the processor to: receive via the network interface a request for a reputation for a URL; query the URL reputation store and determine that the URL does not have a known reliable reputation; add the URL to a URL analysis queue; perform a rough analysis of the URL, and determine from the rough analysis that the URL potentially is for a phishing website; and move the URL ahead in the analysis queue.

There is further disclosed an example computing apparatus, wherein performing the rough analysis of the URL comprises first filtering the URL.

There is further disclosed an example computing apparatus, wherein filtering the URL comprises filtering on an attribute selected from the group consisting of URL prevalence, length of the URL, presence of secure socket layer (SSL) or transport layer security (TLS), and context.

There is further disclosed an example computing apparatus, wherein performing the rough analysis of the URL comprising comparing a web page of the URL to a web page of a known phishing target.

There is further disclosed an example computing apparatus, wherein the web page is a home page of the known phishing target.

There is further disclosed an example computing apparatus, wherein the web page is a login page of the known phishing target.

There is further disclosed an example computing apparatus, wherein comparing the web page of the URL comprises comparing the web page to a current version or one or more archived versions of the known phishing target.

There is further disclosed an example computing apparatus, further comprising comparing the web page of the URL to n most popular phishing targets, wherein n>1.

There is further disclosed an example computing apparatus, wherein n≈100.

There is further disclosed an example computing apparatus, wherein performing the rough analysis of the URL comprises performing an image comparison of a web page of the URL with an image of a known phishing target.

There is further disclosed an example computing apparatus, wherein the image comparison is a comparison for gross visual similarity.

There is further disclosed an example computing apparatus, wherein the image comparison comprises a comparison of a low-resolution image of the known phishing target with a low-resolution image of the web page of the URL.

There is further disclosed an example computing apparatus, wherein the image comparison comprises a comparison of a low-color-depth image of the known phishing target with a low-color-depth image of the web page of the URL.

There is further disclosed an example computing apparatus, wherein the image comparison comprises redacting text fields.

There is further disclosed an example computing apparatus, wherein the instructions are further to instruct the processor to perform a full analysis of the URL, the full analysis being more reliable than the rough analysis.

There is further disclosed an example computing apparatus, wherein the instructions are further to assign a binary reputation to the URL, the binary reputation to indicate that the URL is to a phishing website or not.

There is further disclosed an example computing apparatus, wherein the instructions are further to assign a granular reputation to the URL, the granular reputation to indicate a likelihood, along a spectrum, that the URL is to a phishing website.

There is further disclosed an example computing apparatus, wherein the instructions are further to assign a maximum timeout to analyze URLs not moved ahead in the analysis queue.

There is further disclosed an example computing apparatus, wherein the maximum timeout is approximately 24 hours.

There is also disclosed an example of one or more tangible, non-transitory computer-readable mediums having stored thereon executable instructions to instruct a processor to: receive a reputation request for a uniform resource locator (URL); determine that the URL has no cached reputation; queue the URL for full analysis by an analysis engine; perform an initial analysis of the URL, the initial analysis configured to have a low false negative rate; and based at least in part on the initial analysis, assign the URL elevated priority in the queue for full analysis.

There is further disclosed an example of one or more tangible, non-transitory computer-readable mediums, wherein the initial analysis is configured to have a permissible high false positive rate.

There is further disclosed an example of one or more tangible, non-transitory computer-readable mediums, wherein the instructions are to perform the initial analysis periodically on a batch of URLs.

There is further disclosed an example of one or more tangible, non-transitory computer-readable mediums, wherein performing the initial analysis of the URL comprises first filtering the URL.

There is further disclosed an example of one or more tangible, non-transitory computer-readable mediums, wherein filtering the URL comprises filtering on an attribute selected from the group consisting of URL prevalence, length of the URL, presence of secure socket layer (SSL) or transport layer security (TLS), and context.

There is further disclosed an example of one or more tangible, non-transitory computer-readable mediums, wherein performing the initial analysis of the URL comprises comparing a web page of the URL to a web page of a known phishing target.

There is further disclosed an example of one or more tangible, non-transitory computer-readable mediums, wherein the web page is a home page of the known phishing target.

There is further disclosed an example of one or more tangible, non-transitory computer-readable mediums, wherein the web page is a login page of the known phishing target.

There is further disclosed an example of one or more tangible, non-transitory computer-readable mediums, wherein comparing the web page of the URL comprises comparing the web page to a current version or one or more archived versions of the known phishing target.

There is further disclosed an example of one or more tangible, non-transitory computer-readable mediums, further comprising comparing the web page of the URL to n most popular phishing targets, wherein n>1.

There is further disclosed an example of one or more tangible, non-transitory computer-readable mediums, wherein n≈100.

There is further disclosed an example of one or more tangible, non-transitory computer-readable mediums, wherein performing the initial analysis of the URL comprises performing an image comparison of a web page of the URL with an image of a known phishing target.

There is further disclosed an example of one or more tangible, non-transitory computer-readable mediums, wherein the image comparison is a comparison for gross visual similarity.

There is further disclosed an example of one or more tangible, non-transitory computer-readable mediums, wherein the image comparison comprises a comparison of a low-resolution image of the known phishing target with a low-resolution image of the web page of the URL.

There is further disclosed an example of one or more tangible, non-transitory computer-readable mediums, wherein the image comparison comprises a comparison of a low-color-depth image of the known phishing target with a low-color-depth image of the web page of the URL.

There is further disclosed an example of one or more tangible, non-transitory computer-readable mediums, wherein the image comparison comprises redacting text fields.

There is further disclosed an example of one or more tangible, non-transitory computer-readable mediums, wherein the instructions are further to instruct the processor to perform a full analysis of the URL, the full analysis being more reliable than the initial analysis.

There is further disclosed an example of one or more tangible, non-transitory computer-readable mediums, wherein the instructions are further to assign a binary reputation to the URL, the binary reputation to indicate that the URL is to a phishing website or not.

There is further disclosed an example of one or more tangible, non-transitory computer-readable mediums, wherein the instructions are further to assign a granular reputation to the URL, the granular reputation to indicate a likelihood, along a spectrum, that the URL is to a phishing website.

There is further disclosed an example of one or more tangible, non-transitory computer-readable mediums, wherein the instructions are further to assign a maximum timeout to analyze URLs not assigned an elevated priority in the analysis queue.

There is further disclosed an example of one or more tangible, non-transitory computer-readable mediums, wherein the maximum timeout is approximately 24 hours.

There is also disclosed an example computer-implemented method of providing URL-based anti-phishing services, comprising: identifying a plurality of URLs that lack a reliable phishing-related reputation; queuing the URLs in a first-in-first-out full analysis queue, the queue for ordering URLs for full analysis; periodically identifying within the full analysis queue a batch of URLs that have not received an initial analysis; subjecting a URL of the batch to an initial analysis, the initial analysis being less thorough than the full analysis; and according to the initial analysis, determining that the URL is potentially to a phishing website and accelerating the URL's priority in the full analysis queue.

There is further disclosed an example method, wherein subjecting the URL to the initial analysis comprises first filtering the URL.

There is further disclosed an example method, wherein filtering the URL comprises filtering on an attribute selected from the group consisting of URL prevalence, length of the URL, presence of secure socket layer (SSL) or transport layer security (TLS), and context.

There is further disclosed an example method, wherein the initial analysis comprises comparing a web page of the URL to a web page of a known phishing target.

There is further disclosed an example method, wherein the web page is a home page of the known phishing target.

There is further disclosed an example method, wherein the web page is a login page of the known phishing target.

There is further disclosed an example method, wherein comparing the web page of the URL comprises comparing the web page to a current version or one or more archived versions of the known phishing target.

There is further disclosed an example method, further comprising comparing the web page of the URL to n most popular phishing targets, wherein n>1.

There is further disclosed an example method, wherein n≈100.

There is further disclosed an example method, wherein the initial analysis comprises performing an image comparison of a web page of the URL with an image of a known phishing target.

There is further disclosed an example method, wherein the image comparison is a comparison for gross visual similarity.

There is further disclosed an example method, wherein the image comparison comprises a comparison of a low-resolution image of the known phishing target with a low-resolution image of the web page of the URL.

There is further disclosed an example method, wherein the image comparison comprises a comparison of a low-color-depth image of the known phishing target with a low-color-depth image of the web page of the URL.

There is further disclosed an example method, wherein the image comparison comprises redacting text fields.

There is further disclosed an example method, further comprising performing the full analysis of the URL.

There is further disclosed an example method, further comprising assigning a binary reputation to the URL, the binary reputation to indicate that the URL is to a phishing website or not.

There is further disclosed an example method, further comprising assigning a granular reputation to the URL, the granular reputation to indicate a likelihood, along a spectrum, that the URL is to a phishing website.

There is further disclosed an example method, further comprising assigning a maximum timeout to analyze URLs not moved ahead in the full analysis queue.

There is further disclosed an example method, wherein the maximum timeout is approximately 24 hours.

There is further disclosed an example apparatus, further comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus, comprising:
   a processor and a memory;
   a uniform resource locator (URL) reputation store;
   a network interface; and
   instructions encoded within the memory to instruct the processor to:
   receive via the network interface a request for a reputation for a URL;
   query the URL reputation store and determine that the URL does not have a known reliable reputation;
   add the URL to a URL analysis queue;
   perform a rough analysis of the URL comprising comparing a web page at the URL to a plurality of n most popular websites for targeting by phishing attackers, wherein n>1, and determine from the rough analysis that the URL potentially is for a phishing website; and
   based at least in part on the determination that the URL potentially is for a phishing website, move the URL ahead in the URL analysis queue.

2. The computing apparatus of claim 1, wherein performing the rough analysis of the URL further comprises first filtering the URL.

3. The computing apparatus of claim 1, wherein a website for targeting by phishing attackers comprises a homepage of the website for targeting by phishing attackers.

4. The computing apparatus of claim 1,
   wherein a website for targeting by phishing attackers comprises a login page of the website for targeting by phishing attackers.

5. The computing apparatus of claim 1, wherein comparing the web page of the URL comprises comparing the web page to a current version or one or more archived versions of a website for targeting by phishing attackers.

6. The computing apparatus of claim 1, wherein n≈100.

7. The computing apparatus of claim 1, wherein performing the rough analysis of the URL comprises performing an image comparison of a web page of the URL with an image of a known phishing target.

8. The computing apparatus of claim 7, wherein the image comparison is a comparison for gross visual similarity.

9. The computing apparatus of claim 7, wherein the image comparison comprises a comparison of a low-resolution image of the known phishing target with a low-resolution image of the web page of the URL.

10. The computing apparatus of claim 7, wherein the image comparison comprises a comparison of a low-color-depth image of the known phishing target with a low-color-depth image of the web page of the URL.

11. One or more tangible, non-transitory computer-readable mediums having stored thereon executable instructions to instruct a processor to:
   receive a reputation request for a uniform resource locator (URL);
   determine that the URL has no cached reputation;
   queue the URL for into an analysis queue comprising a prioritized list of URLs for later full analysis by an analysis engine;
   perform an initial analysis of the URL, the initial analysis comprising comparing a web page at the URL to a plurality of n most popular websites for targeting by phishing attackers, wherein n>1, and determine from the initial analysis that the URL potentially is for a phishing website; and
   based at least in part on the initial analysis, assign the URL elevated priority in the analysis queue, wherein the full analysis is separate and different from the initial analysis.

12. The one or more tangible, non-transitory computer-readable mediums of claim 11, wherein performing the initial analysis of the URL comprises performing an image comparison of a web page of the URL with an image of a known phishing target.

13. The one or more tangible, non-transitory computer-readable mediums of claim 12, wherein the image comparison comprises redacting text fields.

14. The one or more tangible, non-transitory computer-readable mediums of claim 13, wherein the instructions are further to assign a binary reputation to the URL, the binary reputation to indicate that the URL is a phishing website or not.

15. The one or more tangible, non-transitory computer-readable mediums of claim 13, wherein the instructions are further to assign a granular reputation to the URL, the granular reputation to indicate a likelihood, along a spectrum, that the URL is a phishing website.

16. The one or more tangible, non-transitory computer-readable mediums of claim 12, wherein the comparison is for gross visual similarity.

17. The one or more tangible, non-transitory computer-readable mediums of claim 11, wherein n is approximately 100.

18. A computer-implemented method of providing URL-based anti-phishing services, comprising:
   identifying a plurality of URLs that lack a reliable phishing-related reputation;
   queuing the URLs in a first-in-first-out full analysis queue, the queue for prioritizing the URLs for full analysis;
   periodically identifying within the full analysis queue a batch of URLs that have not received an initial analysis;

subjecting a URL of the batch to an initial analysis, the initial analysis comprising comparing a web page at the URL to a plurality of n most popular websites for targeting by phishing attackers, wherein n>1, and determining from the initial analysis that the URL potentially is for a phishing website; and based at least in part on the determining, accelerating the URL's priority in the full analysis queue.

19. The method of claim 18, further comprising assigning a maximum timeout to analyze URLs not moved ahead in the full analysis queue.

20. The method of claim 18, wherein n is approximately 100.

* * * * *